United States Patent
Kondo

(10) Patent No.: US 9,131,193 B2
(45) Date of Patent: Sep. 8, 2015

(54) IMAGE-PROCESSING DEVICE REMOVING ENCIRCLING LINES FOR IDENTIFYING SUB-REGIONS OF IMAGE

(71) Applicant: Masaki Kondo, Toyoake (JP)

(72) Inventor: Masaki Kondo, Toyoake (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/219,127

(22) Filed: Mar. 19, 2014

(65) Prior Publication Data

US 2014/0285861 A1   Sep. 25, 2014

(30) Foreign Application Priority Data

Mar. 19, 2013   (JP) ................................. 2013-056397

(51) Int. Cl.
| | |
|---|---|
| H04N 1/60 | (2006.01) |
| G03F 3/08 | (2006.01) |
| H04N 1/46 | (2006.01) |
| G06K 9/00 | (2006.01) |
| H04N 1/62 | (2006.01) |
| G06K 9/34 | (2006.01) |
| G06T 5/00 | (2006.01) |
| G06T 11/00 | (2006.01) |
| G06T 11/60 | (2006.01) |
| G06K 9/20 | (2006.01) |

(52) U.S. Cl.
CPC ................ H04N 1/62 (2013.01); G06K 9/2063 (2013.01); G06K 9/346 (2013.01); G06T 5/005 (2013.01); G06T 11/00 (2013.01); G06T 11/60 (2013.01)

(58) Field of Classification Search
None
See application file for complete search history.

(56) References Cited

U.S. PATENT DOCUMENTS

| | | | | | |
|---|---|---|---|---|---|
| 5,465,307 | A | * | 11/1995 | Azumaya et al. | 382/165 |
| 5,796,491 | A | * | 8/1998 | Hayashi | 358/518 |
| 5,809,215 | A | * | 9/1998 | Heydinger et al. | 358/1.9 |
| 5,850,298 | A | * | 12/1998 | Narahara et al. | 358/518 |
| 5,940,192 | A | * | 8/1999 | Ichikawa et al. | 358/530 |
| 6,167,167 | A | * | 12/2000 | Matsugu et al. | 382/283 |
| 7,330,195 | B2 | * | 2/2008 | Li | 345/629 |
| 7,884,977 | B2 | * | 2/2011 | Mori | 358/505 |
| 8,090,218 | B2 | * | 1/2012 | Larkin et al. | 382/289 |
| 8,233,676 | B2 | * | 7/2012 | Ngan et al. | 382/118 |

(Continued)

FOREIGN PATENT DOCUMENTS

| | | |
|---|---|---|
| JP | H09-163134 A | 6/1997 |
| JP | H09-214740 A | 8/1997 |

OTHER PUBLICATIONS

Aug. 27, 2014—(EP) Extended Search Report—App 14160575.8.

(Continued)

*Primary Examiner* — Madelein Nguyen
(74) *Attorney, Agent, or Firm* — Banner & Witcoff, Ltd.

(57) ABSTRACT

An image-processing device includes a processor and a memory. The memory stores computer-readable instructions therein. The computer-readable instructions cause the image-processing device to identify a first region and a second region in a target image. The first region represents an encircling line for identifying a specific sub-region in the target image. The first region includes a plurality of pixels. The second region includes an inside region that is surrounded by the first region, and an outside region that is outside the first region. The image-processing device further performs changing a color value of a first target pixel included in the plurality of the pixels using a first internal pixel and a first external pixel.

16 Claims, 9 Drawing Sheets

(56) References Cited

U.S. PATENT DOCUMENTS

| | | | |
|---|---|---|---|
| 8,385,647 B2* | 2/2013 | Hawley et al. | 382/173 |
| 8,451,506 B2* | 5/2013 | Oka | 358/3.26 |
| 8,593,680 B2* | 11/2013 | Woolfe et al. | 358/1.9 |
| 8,705,086 B2* | 4/2014 | Ohk | 358/1.15 |
| 8,760,464 B2* | 6/2014 | Bryant et al. | 345/594 |
| 2003/0090751 A1* | 5/2003 | Itokawa et al. | 358/538 |
| 2004/0052416 A1* | 3/2004 | Curry et al. | 382/173 |
| 2006/0045372 A1 | 3/2006 | Wang et al. | |
| 2008/0012967 A1 | 1/2008 | Kuwabara | |
| 2008/0100858 A1* | 5/2008 | Kondo | 358/1.9 |
| 2008/0111998 A1* | 5/2008 | Edge | 358/1.9 |
| 2009/0226085 A1* | 9/2009 | Shiraishi | 382/167 |
| 2012/0210229 A1* | 8/2012 | Bryant et al. | 715/723 |
| 2013/0265615 A1* | 10/2013 | Nakashima | 358/3.27 |
| 2014/0293383 A1* | 10/2014 | Ozawa | 358/538 |

OTHER PUBLICATIONS

Hsu, Han-Jen, et al., "A hybrid algorithm with artifact detection mechanism for region filling after object removal from a digital photograph," IEEE transactions on image processing 16, No. 6 (Jun. 2007): 1611-1622.

Gastal, Eduardo SL, et al., "Shared Sampling for Real-Time Alpha Matting," In Computer Graphics Forum, vol. 29, No. 2, pp. 575-584, Blackwell Publishing Ltd, 2010.

Co-pending U.S. Appl. No. 14/219,169, filed Mar. 19, 2014.

* cited by examiner $$Pti = \left( \frac{D2 \times P1i + D1 \times P2i}{D1 + D2} + \frac{D4 \times P3i + D3 \times P4i}{D3 + D4} \right) \times \frac{1}{2}$$

$$Pti = \left( \frac{D2 \times P1i + D1 \times P2i}{D1 + D2} + \frac{D4 \times P3i + D3 \times P4i}{D3 + D4} \right.$$
$$\left. + \frac{D6 \times P5i + D5 \times P6i}{D5 + D6} + \frac{D8 \times P7i + D7 \times P8i}{D7 + D8} \right) \times \frac{1}{4}$$

FIG. 7A
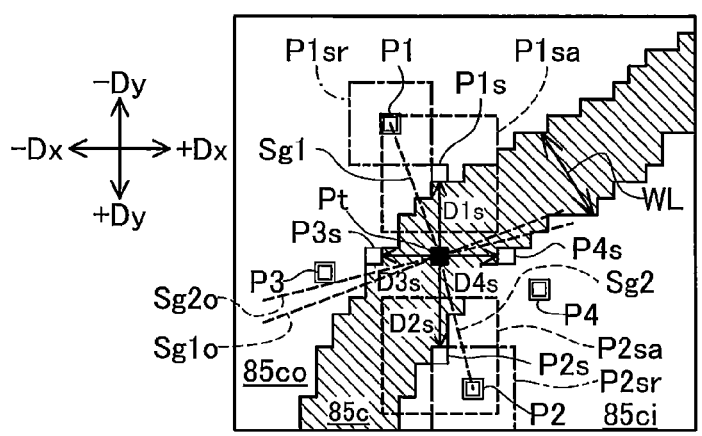
FIG. 7B
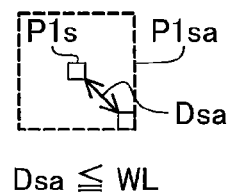
$Dsa \leqq WL$
FIG. 7C
$$Pti = \left( \frac{D2s \times P1ia + D1s \times P2ia}{D1s + D2s} + \frac{D4s \times P3ia + D3s \times P4ia}{D3s + D4s} \right) \times \frac{1}{2}$$

FIG. 8A

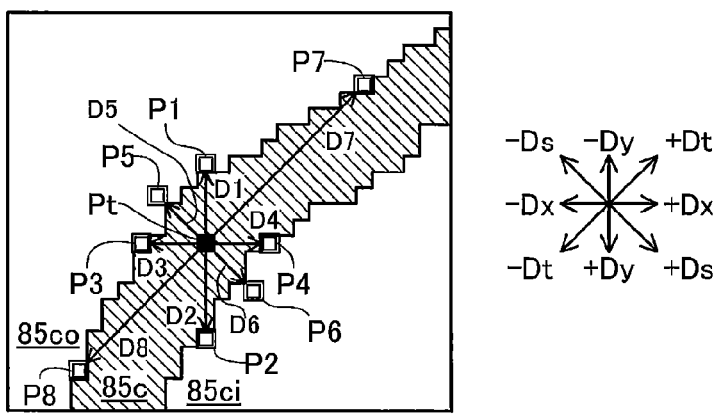

FIG. 8B dC1(color value difference of the first pair Pr1(P1, P2))
dC2(color value difference of the second pair Pr2(P3, P4))
dC3(color value difference of the third pair Pr3(P5, P6))
dC4(color value difference of the fourth pair Pr4(P7, P8))

Pm1, Pm2(pair having the largest difference in color value)
Pn1, Pn2(pair having the second largest difference in color value)

FIG. 8C $$Pti = \left( \frac{Dm2 \times Pm1i + Dm1 \times Pm2i}{Dm1 + Dm2} + \frac{Dn2 \times Pn1i + Dn1 \times Pn2i}{Dn1 + Dn2} \right) \times \frac{1}{2}$$

IMAGE-PROCESSING DEVICE REMOVING ENCIRCLING LINES FOR IDENTIFYING SUB-REGIONS OF IMAGE

CROSS REFERENCE TO RELATED APPLICATION

This application claims priority from Japanese Patent Application No. 2013-056397 filed Mar. 19, 2013. The entire content of the priority application is incorporated herein by reference.

TECHNICAL FIELD

The present invention relates to an image-processing device and a computer program that employ encircling lines for identifying sub-regions of an image.

BACKGROUND

Among the various conventional image processes known in the art, there are image processes for identifying sub-regions of an image and for processing the identified sub-regions. One such image process that has been proposed involves accentuating regions of an image delineated by closed curves by increasing the density in those regions. In this process, the user draws closed curves on the original using a marker and scans the original with an image scanner. The image data acquired from the scanning operation is then processed.

SUMMARY

In the process described above, encircling lines (such as closed curves) surrounding sub-regions in the image can be used for identifying specific sub-regions. Various image processes, including but not limited to an accentuating process, can be performed on the sub-regions identified by encircling lines. However, noticeable traces of the encircling lines drawn may be left unintentionally in the processed image. For example, the outputted processed image may still include the encircling lines in a color different from the color of the region surrounding the encircling lines.

In view of the foregoing, it is an object of the present invention to provide a technique for preventing encircling lines drawn in an image from being noticeable after image processing.

In order to attain the above and other objects, the present invention provides an image-processing device that includes a processor and a memory. The memory stores computer-readable instructions therein. The computer-readable instructions, when executed by the processor, cause the image-processing device to perform identifying a first region and a second region in a target image represented by target image data. The first region represents an encircling line for identifying a specific sub-region in the target image. The first region includes a first target pixel and a second target pixel. The second region is different from the first region. The second region includes an inside region that is surrounded by the first region, and an outside region that is outside the first region. The inside region has a plurality of internal pixels. The outside region has a plurality of external pixels. The computer-readable instructions further causes the image-processing device to perform to change a color value of each of the plurality of pixels using a color value of one of the plurality of internal pixels and a color value of one of the plurality of external pixels, wherein the changing changes a color value of a first target pixel included in the plurality of pixels using a color value of a first internal pixel included in the plurality of internal pixels and a color value of a first external pixel included in the plurality of external pixels, and wherein the changing changes a color value of a second target pixel included in the plurality of pixels using a color value of a second internal pixel included in the plurality of internal pixels and a color value of a second external pixel included in the plurality of external pixels.

According to another aspect, the present invention provides a non-transitory computer readable storage medium storing a set of program instructions executed by a computer. The program instructions include identifying a first region and a second region in a target image represented by target image data. The first region represents an encircling line for identifying a specific sub-region in the target image. The first region includes a first target pixel and a second target pixel. The second region is different from the first region. The second region includes an inside region that is surrounded by the first region, and an outside region that is outside the first region. The inside region has a plurality of internal pixels. The outside region has a plurality of external pixels. The computer-readable instructions further causes the image-processing device to perform to change a color value of each of the plurality of pixels using a color value of one of the plurality of internal pixels and a color value of one of the plurality of external pixels, wherein the changing changes a color value of a first target pixel included in the plurality of pixels using a color value of a first internal pixel included in the plurality of internal pixels and a color value of a first external pixel included in the plurality of external pixels, and wherein the changing changes a color value of a second target pixel included in the plurality of pixels using a color value of a second internal pixel included in the plurality of internal pixels and a color value of a second external pixel included in the plurality of external pixels.

BRIEF DESCRIPTION OF THE DRAWINGS

In the drawings:

FIG. 7A is a schematic diagram illustrating a color correction process performed on the encircling line region according to a third embodiment;

FIG. 7B is a schematic diagram showing a relationship between a first searching range and a width of the encircling line according to the third embodiment;

FIG. 7C shows an equation for calculating the color value of the first target pixel according to the third embodiment;

FIG. 8A is a schematic diagram illustrating a color correction process performed on the encircling line region according to a fourth embodiment;

FIG. 8B is an explanatory diagram for describing four pixel pairs, color value differences, and selected pixel pairs according to the fourth embodiment;

FIG. 8C shows an equation for calculating the color value of the first target pixel according to the fourth embodiment.

DETAILED DESCRIPTION

An image-processing system and a computer program according to embodiments of the present invention will be described in detail with reference to the accompanying drawings.

A. First Embodiment

Figure 1:
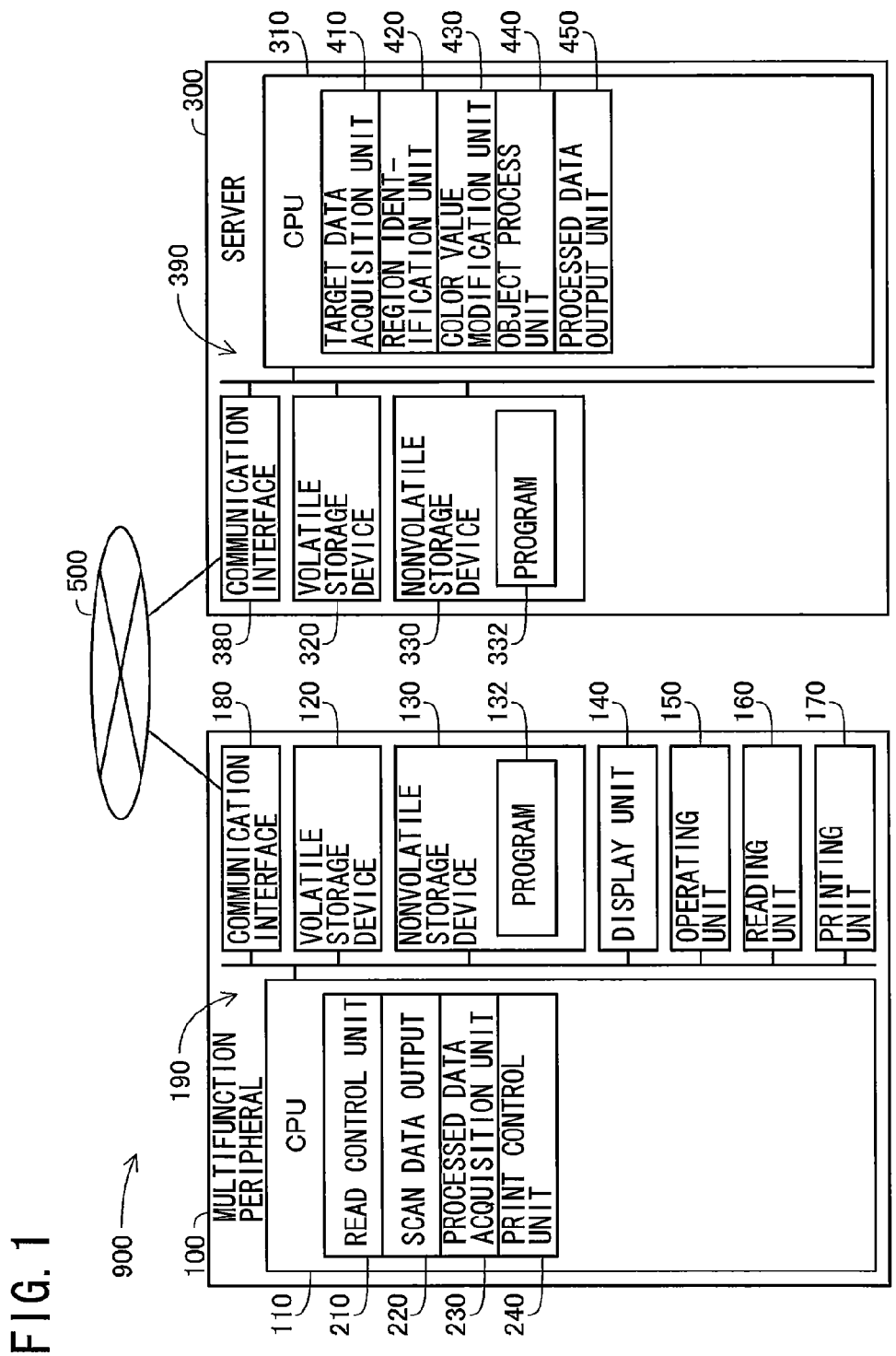
FIG. 1 is a block diagram showing the structure of an image-processing system according to a first embodiment of the present invention.

An image-processing system 900 according to a first embodiment of the present invention will be described with reference to FIGS. 1 to 5. FIG. 1 is a block diagram showing the structure of an image-processing system 900 according to the first embodiment of the present invention. The image-processing system 900 is configured of a network 500, a multifunction peripheral 100 connected to the network 500, and a server 300 also connected to the network 500. The multifunction peripheral 100 can execute a process for copying an original in response to a command from the user. More specifically, the multifunction peripheral 100 optically scans an original and prints an image based on the scan data. An original may represent a plurality of objects that may include text, photos, and illustrations. The user can draw a line around each object in the original (hereinafter called an "encircling line") using a pen having a prescribed color (red, in the first embodiment). The multifunction peripheral 100 and server 300 execute an image process to print an image acquired by erasing any object surrounded by an encircling line from the scanned image.

The multifunction peripheral 100 includes a CPU 110 for performing overall control of the multifunction peripheral 100; a volatile storage device 120, such as DRAM; a nonvolatile storage device 130, such as a flash memory; a display unit 140 such as a liquid crystal panel; an operating unit 150 such as a touchscreen; a reading unit 160; a printing unit 170; and a communication interface 180 (a wireless communication interface conforming to the IEEE 802.11a/b/g/n standards, for example) for communicating with other devices, such as the server 300. The nonvolatile storage device 130 stores a program 132. The communication interface 180 is connected to the network 500.

The reading unit 160 generates image data representing an original by optically scanning the original. The reading unit 160 is provided with an optical sensor such as a contact image sensor (CIS; not shown) for optically reading an original placed on the reading unit 160 to generate image data representing the original. In the following description, image data generated by the reading unit 160 will be called "scan data."

The printing unit 170 is an inkjet printer that functions to print images. However, the present invention may employ another type of printer, such as a laser printer.

The CPU 110 executes the program 132 while utilizing the volatile storage device 120 and the nonvolatile storage device 130 in order to implement data processes described later. Taken together, the CPU 110, the volatile storage device 120, and the nonvolatile storage device 130 correspond to a data-processing unit 190 used to execute the functions to implement data processes. As shown in FIG. 1, the CPU 110 functions as a read control unit 210, a scan data output unit 220, a processed data acquisition unit 230, and a print control unit 240. The functions of these process units will be described later.

The server 300 includes a CPU 310 for performing overall control of the server 300; a volatile storage device 320, such as DRAM; a nonvolatile storage device 330, such as flash memory; and a communication interface 380 (a wireless communication interface conforming to the IEEE 802.3 standard, for example) for communicating with other devices, such as the multifunction peripheral 100. The nonvolatile storage device 330 stores a program 332. The communication interface 380 is connected to the network 500.

The CPU 310 executes the program 332 while utilizing the volatile storage device 320 and nonvolatile storage device 330 to implement an image process described later. Taken together, the CPU 310, the volatile storage device 320, and the nonvolatile storage device 330 correspond to an image-processing unit 390 that serves to implement the image process. As shown in FIG. 1, the CPU 310 functions as a target data acquisition unit 410, a region identification unit 420, a color value modification unit 430, an object process unit 440, and a processed data output unit 450. The functions of these process units will be described later.

Figure 2:
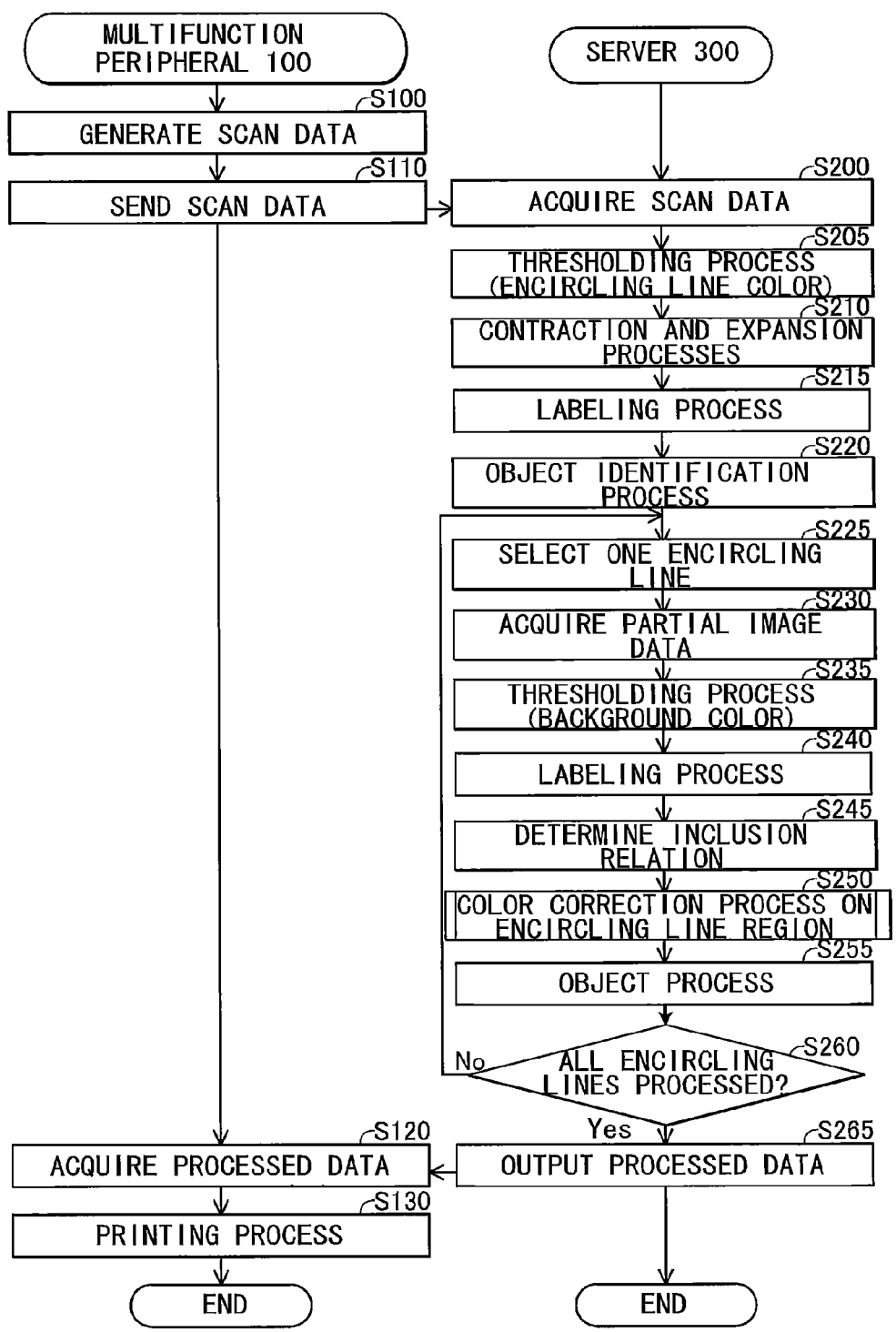
FIG. 2 is a flowchart illustrating steps in an image process.

FIG. 2 is a flowchart illustrating steps in the image process, and indicates both the process performed by the multifunction peripheral 100 and the process performed by the server 300. The CPU 110 of the multifunction peripheral 100 begins this image process when the user issues a command to the multifunction peripheral 100 to copy an original, for example. The user can input various data including copy commands by operating the operating unit 150 of the multifunction peripheral 100.

In S100 at the beginning of the image process, the read control unit 210 (see FIG. 1) of the multifunction peripheral 100 controls the reading unit 160 to acquire scan data representing the original. Scan data is bitmap data representing colors in red (R), green (G), and blue (B) color component values (256-level gradation values in the first embodiment), for example. Hereinafter, red, green, and blue color component values will be respectively called the R component value, G component value, and B component value. Further, values representing a color will be collectively called a "color value" (for example, the set of R, G, and B component values).

Figure 3A:
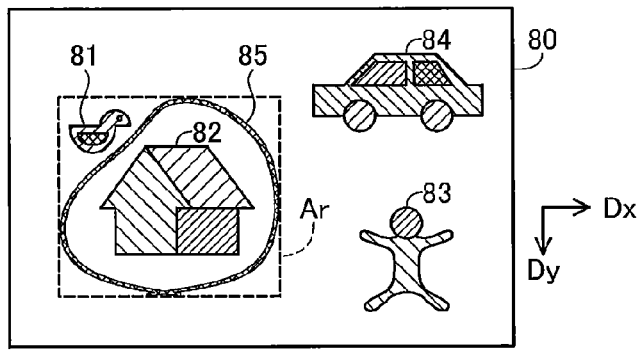
FIG. 3A is a schematic diagram showing a sample image represented by scan data.

FIG. 3A is a schematic diagram showing a sample image represented by scan data (hereinafter called a "scanned image"). A scanned image 80 in FIG. 3A includes an encircling line object 85 and four illustration objects: a first object 81, a second object 82, a third object 83, and a fourth object 84. The encircling line object 85 is an object that the user has handwritten on the original using a pen in a predetermined color (red in the preferred embodiment).

FIGS. 3A, 3B, 3C and 3D also indicate a first direction Dx and a second direction Dy. The scan data representing the scanned image 80 indicates the color of each pixel arranged in gridlines along the directions Dx and Dy. In the following description, the first direction Dx will also be called the +Dx direction, while the direction opposite to the first direction Dx will be called the −Dx direction. Similarly, the second direction Dy will also be called the +Dy direction, while the opposite direction will be called the −Dy direction. In addition, the side relative to the +Dx direction will be simply called the +Dx side, and the same wording will be used for other directions.

In S110 of FIG. 2, the scan data output unit 220 (see FIG. 1) outputs the scan data to the server 300 via the network 500. In S200 the target data acquisition unit 410 (see FIG. 1) of the server 300 acquires the scan data from the multifunction peripheral 100 as image data to be processed (also called "target image data"). The subsequent steps S205-S220 constitute a process for identifying an encircling line in the scanned image 80.

In S205 the region identification unit 420 (see FIG. 1) generates binary image data through a thresholding process on the scan data. Specifically, the region identification unit 420 classifies each of the pixels in the scan data as either a pixel having a color value that specifies the color of the encircling line (red in the first embodiment) or a pixel possessing a color value specifying another color. Pixels having a color value specifying the color of the encircling line will be called candidate pixels, while pixels having other color values will be called non-candidate pixels. The thresholding process is performed based on a prescribed range of colors appropriate for pixels representing an encircling line (hereinafter called the "encircling line color range"). Since the color of the encircling line is assumed to be red in the first embodiment, the encircling line color range may be set to a range of colors in which the R component value is at least a red reference value Rth, the G component value is no greater than a green reference value Gth, and the B component value is no greater than a blue reference value Bth. Pixels having color values that fall within the encircling line color range are classified as candidate pixels, while pixels having color values outside the encircling line color range are classified as non-candidate pixels. Note that the encircling line color may be set to a color other than red, and the encircling line color range may be set to a partial color range that includes the color anticipated to be the color of the encircling line.

Figure 3B:
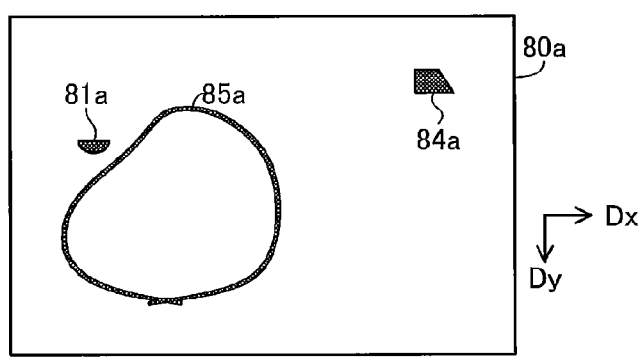
FIG. 3B is a schematic diagram showing an example of a binary image.

FIG. 3B is a schematic diagram showing an example of a binary image 80a represented by the binary image data. The binary image 80a includes three separate candidate regions: a first candidate region 81a, a second candidate region 84a, and a third candidate region 85a. The first candidate region 81a represents part of the first object 81; the second candidate region 84a represents part of the fourth object 84; the third candidate region 85a represents the encircling line object 85. Each of the candidate regions 81a, 84a, and 85a is configured of a plurality of contiguous candidate pixels. Here, two pixels are considered to be contiguous (i.e., adjacent to each other) when one pixel is positioned within a 3×3 pixel block centered on the other pixel. As an alternative, two pixels may be considered to be contiguous when one pixel is adjacent to the other pixel in one of the four directions +Dx, −Dx, +Dy, and −Dy.

In S210 of FIG. 2, the region identification unit 420 executes a contraction process on the binary image data for contracting the candidate regions, resulting in the generation of contracted binary image data. Next, the region identification unit 420 executes an expansion process on the contracted binary image data for expanding the contracted candidate regions, producing expanded binary image data.

The contraction process is implemented by performing a process for each non-candidate pixel (target pixel) in the binary image data to convert all candidate pixels within a prescribed contraction range of the target pixel to non-candidate pixels, for example. This contraction range may be, for example, a 3×3 (three rows×three columns) range centered on a non-candidate pixel serving as the target pixel. The contraction process serves to change candidate pixels near this non-candidate pixel, i.e., candidate pixels forming the edge of a candidate region, into non-candidate pixels, thereby contracting the candidate region. This process also eliminates small candidate regions produced by noise, i.e., candidate regions configured of only a few candidate pixels (not shown in the drawings).

The expansion process is implemented by performing a process for each candidate pixel (target pixel) in the binary image data to convert all non-candidate pixels within a prescribed expansion range of the target pixel to candidate pixels, for example. The expansion range may be a 5×5 (five rows×five columns) range centered on a candidate pixel serving as the target pixel, for example. Thus, the expansion process changes non-candidate pixels near a candidate pixel, i.e., non-candidate pixels near the edge of a candidate region, to candidate pixels, thereby expanding the candidate region. In addition, breaks in the third candidate region 85a representing the encircling line object 85 (hereinafter called "disconnected parts") may be produced in the contraction process due to noise or thin or faint pen lines (not shown). The expansion process can also connect these disconnected parts.

Figure 3C:
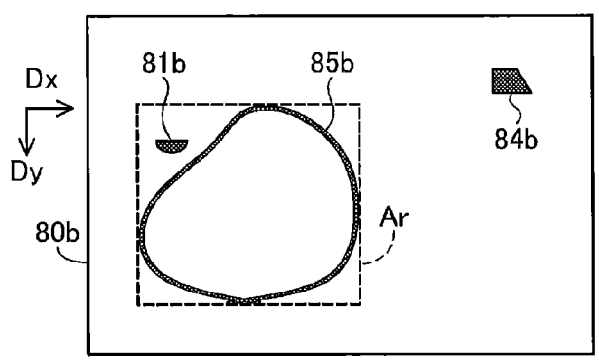
FIG. 3C is a schematic diagram showing an example of a binary image that has undergone contraction and expansion processes.

FIG. 3C is a schematic diagram showing an example of a binary image 80b represented by binary image data that has undergone the contraction and expansion processes. The binary image 80b includes three candidate regions: a first candidate region 81b, a second candidate region 84b, and a third candidate region 85b. The candidate regions 81b, 84b, and 85b respectively correspond to the three candidate regions 81a, 84a, and 85a represented by the binary image 80a of FIG. 3B.

As described above, the contraction and expansion processes serve to eliminate noise and to connect disconnected parts. Accordingly, performing these processes can improve the precision in identifying the encircling lines in an object identification process described later.

The contraction range and the expansion range described above are merely one example of the degree of contraction achieved by the contraction process and the degree of expansion achieved by the expansion process, respectively. When the contraction process is performed prior to the expansion process, the degree of the expansion process (i.e., the size of the expansion range) is preferably larger than the degree of the contraction process (i.e., the size of the contraction range). Setting the ranges to have this relationship can more appropriately connect disconnected parts. However, the expansion process may be executed prior to the contraction process, in which the degree of the expansion process is preferably smaller than the degree of the contraction process. This relationship can more appropriately eliminate candidate regions produced by noise.

In S215 of FIG. 2, the region identification unit 420 performs a labeling process on the binary image data resulting from the contraction and expansion processes to assign discrete identifiers to the separate candidate regions. Specifically, the region identification unit 420 assigns one identifier to each region configured of one or more contiguous candidate pixels (i.e., a candidate region). The region identification unit 420 assigns a different identifier to each of the plurality of separate candidate regions. Thus, the labeling process serves to identify each of the candidate regions. In the example of FIG. 3C, the region identification unit 420 assigns a discrete identifier to each of the first candidate region 81b, the second candidate region 84b, and the third candidate region 85b. The region identification unit 420 generates first label data representing the results of this labeling process (for example, data correlating pixels with identifiers).

In S220 of FIG. 2, the region identification unit 420 executes the object identification process on the candidate regions identified in S215. The object identification process serves to identify a region representing an encircling line from among the identified candidate regions. For example, when a candidate region has a loop-like shape, the region identification unit 420 determines that this candidate region represents an encircling line. In the example of FIG. 3C, the region identification unit 420 identifies the loop-shaped third candidate region 85b as a region representing an encircling line. Hereinafter, a candidate region representing an encircling line will be called an "encircling line region."

Any of various methods may be used to determine whether a candidate region has a loop shape. Here, one possible method will be described using the example of the binary image 80b in FIG. 3C. In this example, the candidate region being subjected to the determination will be called the "target region"; pixels in the target region will be called "target-region pixels"; and pixels outside the target region will be called "non-target-region pixels." Hence, when the third candidate region 85b is the target region, all pixels included in the third candidate region 85b are target-region pixels, while all pixels not included in the third candidate region 85b are non-target-region pixels. Specifically, the non-target-region pixels include pixels representing the background inside the third candidate region 85b, pixels representing the background outside the third candidate region 85b, and pixels included in the candidate regions 81b and 84b.

First, the region identification unit 420 identifies a region that includes the edges of the binary image 80b and has a plurality of contiguous non-target-region pixels. The identified region surrounds the entire outer periphery of the target region and will be called a "first peripheral region." When the third candidate region 85b is the target region, the first peripheral region includes every region on the outside of the third candidate region 85b, i.e., the region representing the background on the outer peripheral side of the third candidate region 85b, the entire first candidate region 81b, and the second candidate region 84b positioned on the outside of the third candidate region 85b.

The region remaining after excluding the first peripheral region from the binary image 80b is the region encircled by the outermost contour of the target region (hereinafter called the "first determination region"). When the third candidate region 85b is the target region, the first determination region is the entire area enclosed by the outermost contour of the third candidate region 85b, i.e., the third candidate region 85b and the region representing background on the inside of the third candidate region 85b.

Next, the region identification unit 420 determines that the target region has a loop-like shape when the first determination region is found to have an area that includes a plurality of contiguous non-target-region pixels. When the third candidate region 85b is the target region, the region identification unit 420 detects an area having a plurality of contiguous non-target-region pixels (the region representing background) within the first determination region (specifically, the area inside of the third candidate region 85b). Accordingly, the region identification unit 420 determines that the third candidate region 85b has a loop shape. When the region identification unit 420 does not detect an area with a plurality of contiguous non-target-region pixels in the first determination region, the region identification unit 420 determines that the target region does not have a loop shape. For example, if the first candidate region 81b or the second candidate region 84b is the target region, the region identification unit 420 will determine that the target region does not have a loop shape.

Subsequent steps S225-S245 in FIG. 2 constitute a process for identifying a region representing an object encircled by the encircling line. In S225 the region identification unit 420 selects one encircling region from among those encircling regions identified in S220. The following description will assume that the third candidate region 85b is in FIG. 3C has been selected as the target encircling region.

In S230, the region identification unit 420 acquires partial image data that represent a region encompassing the third candidate region 85b from the scan data acquired in S200. FIGS. 3A and 3C indicate a region Ar encompassing the third candidate region 85b (hereinafter called a cropped area Ar. In the first embodiment, the cropped area Ar is a rectangular region represented by the minimum bounding rectangle bounding the third candidate region 85b. The region identification unit 420 acquires the portion of scan data representing the cropped area Ar shown in FIG. 3A as the partial image data.

In S235 of FIG. 2, the region identification unit 420 generates partial binary image data by performing a thresholding process on the partial image data. More specifically, the region identification unit 420 classifies each of the pixels in the partial image data as either a pixel having a color value denoting the background color (hereinafter called a "background pixel") or a pixel having a color value corresponding to a color other than the background color (hereinafter called an "object pixel").

This thresholding process is performed based on a background color range denoting a range of colors for pixels representing the background. In the first embodiment, the region identification unit 420 calculates a color value representing the background color (hereinafter called the "background color value") to be the average color value of a plurality of pixels in the scanned image 80 of FIG. 3A that neighbor the third candidate region 85b in FIG. 3C. The background color value calculated in S235 includes average values of the R component value, G component value, and B component value called an R average value Rave, a G average value Gave, and a B average value Bave, respectively.

Next, the region identification unit 420 sets a color range of prescribed width centered on the background color value as the background color range. For example, the background color range may be a range of colors: (Rave−W)<R component value<(Rave+W), (Gave−W)<G component value< (Gave+W), and (Bave−W)<background color value<(Bave+ W); where, W is a prescribed value corresponding to width.

Note that the background color range is not limited to the range described above, but may be any of various ranges that include colors in the background portions of the scanned image 80. For example, the background color range may be set to a range of colors whose distance from the background color value described above (the Euclidian distance in the RGB color space, for example) is within a prescribed threshold value. Further, the background color value may be calculated according to any of various methods and is not limited to the method described above. For example, the background color value may be set to the average color value of pixels disposed in the edge portion of the scanned image 80. Generally, the region identification unit 420 can analyze the scanned image 80 and implement a thresholding process appropriate for the scanned image 80 by setting a background color range based on the results of this analysis. However, a prescribed range may be employed as the background color range. For example, the background color range may be set to a range of colors whose brightness value computed from the R, G, and B component values is at least a prescribed thresholding value.

Figure 3D:
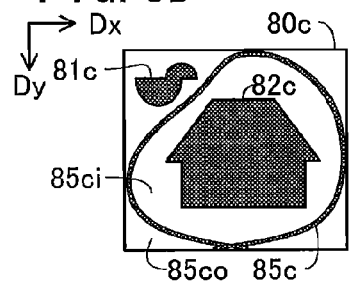
FIG. 3D is a schematic diagram showing an example of a partial binary image.

FIG. 3D is a schematic diagram showing an example of a partial binary image 80c represented by the partial binary image data. The partial binary image 80c includes three separate object regions: a first object region 81c, a second object region 82c, and a third object region 85c. Each of the object regions 81c, 82c, and 85c is configured of a plurality of contiguous object pixels. The first object region 81c represents the first object 81; the second object region 82c represents the second object 82; and the third object region 85c represents the encircling line object 85.

In S240 of FIG. 2, the region identification unit 420 performs a labeling process on the partial binary image data. The steps in the labeling process are identical to those in the labeling process of S215. In the example of FIG. 3D, the region identification unit 420 assigns a discrete identifier to each of the first object region 81c, second object region 82c, and third object region 85c. The region identification unit 420 generates second label data representing the results of this labeling process (for example, data correlating pixels with the identifiers).

The region identification unit 420 also identifies object regions overlapping the encircling line regions identified in S220 as encircling line regions. Since the third object region 85c overlaps the third candidate region 85b of FIG. 3C in the example of FIG. 3D, the region identification unit 420 identifies the third object region 85c as an encircling line region 85c.

In S245 of FIG. 2, the region identification unit 420 determines whether an object region is enclosed by the encircling line region 85c, for each of the object regions other than the encircling line region 85c. For example, the region identification unit 420 determines that an object region is enclosed by the encircling line region 85c when the object region overlaps the region on the inner side of the encircling line region 85c (hereinafter called an "inside region 85ci"). In the example of FIG. 3D, the second object region 82c overlaps the inside region 85ci. Thus, the region identification unit 420 determines that the second object region 82c is encircled by the encircling line region 85c. The first object region 81c does not overlap the inside region 85ci, but overlaps the region on the outer side of the encircling line region 85c (hereinafter called an "outside region 85co"). Thus, the region identification unit 420 determines that the first object region 81c is not enclosed by the encircling line region 85c. The region identification unit 420 also generates inclusion relation data representing the determination results, such as data representing correlations between the identifier of an object region and a flag indicating whether the object region is enclosed by the encircling line region 85c.

Note that any of various methods may be employed to determine whether an object region overlaps the region inside the encircling line region 85c (the inside region 85ci in this example). Here, one possible method will be described using the example of the partial binary image 80c in FIG. 3D. In this description, pixels included in the encircling line regions will be called "encircling-line pixels," and pixels other than the encircling-line pixels will be called "non-encircling-line pixels." In the example of FIG. 3D, pixels included in the encircling line region 85c are encircling-line pixels, while pixels not included in the encircling line region 85c are non-encircling-line pixels. That is, the non-encircling-line pixels include pixels representing the background inside the encircling line region 85c, pixels representing the background outside the encircling line region 85c, and pixels included in the first object region 81c and second object region 82c.

First, the region identification unit 420 identifies a region that includes the edges of the partial binary image 80c and is configured of a plurality of contiguous non-encircling-line pixels. The identified region surrounds the outer peripheral side of the encircling line region 85c (the outside region 85co in this example) and is hereinafter called the "second peripheral region." Specifically, the second peripheral region is the entire outer peripheral side of the encircling line region 85c, i.e., the entire region representing the background on the outer peripheral side of the encircling line region 85c, and the first object region 81c disposed on the outer peripheral side of the encircling line region 85c.

Next, the region of the partial binary image 80c that remains after excluding the second peripheral region is enclosed by the outermost contour of the encircling line region 85c (hereinafter called the "second determination region"). Specifically, the second determination region is the entire encircling line region 85c and inside region 85ci. The inside region 85ci includes the region representing the background on the inside of the encircling line region 85c, and the second object region 82c disposed inside the encircling line region 85c.

When the region identification unit 420 detects pixels for an object region in the second determination region, the region identification unit 420 determines that an object overlaps the inside region 85ci, i.e., an object is enclosed within the encircling line. In this example, the region identification unit 420 detects pixels for the second object region 82c in the second determination region. Hence, the region identification unit 420 determines that the second object region 82c (i.e., the second object 82) is enclosed within the encircling line region 85c (i.e., the encircling line object 85). If the region identification unit 420 does not detect a pixel from an object region in the second determination region, then the region identification unit 420 determines that the object does not overlap the inside region 85ci, i.e., that the object region is not enclosed by the encircling line region 85c. In this example, the region identification unit 420 does not detect a pixel from the first object region 81c in the second determination region and, hence, determines that the first object region 81c is not enclosed within the encircling line region 85c.

In this way, the region identification unit 420 identifies object regions representing objects enclosed by the encircling line object 85.

Figure 3E:
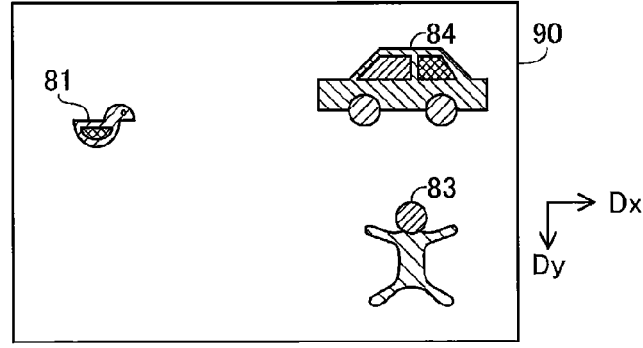
FIG. 3E is a schematic diagram showing an example of a processed image.

Step S250 in FIG. 2 is a process for correcting the color of the encircling line region in order to erase the encircling line from the scanned image 80. The following step S255 is a process for erasing objects enclosed by the encircling line from the scanned image 80. FIG. 3E is a schematic diagram showing an example of a processed image 90. The processed image 90 is an image represented by processed data generated by executing the process of S255 on the scan data. As shown in FIG. 3E, the processed image 90 is obtained by erasing the encircling line object 85 and the second object 82 enclosed by the encircling line object 85 from the scanned image 80.

In S250 of FIG. 2, the color value modification unit 430 (see FIG. 1) changes a color value for each pixel in the scanned image 80 that is included in the encircling line region 85c represented by the partial binary image 80c to a color value corresponding to the color values of pixels in the peripheral region of the encircling line region 85c. Through this process, the region in the scanned image 80 that represented the encircling line object 85 now represents the background in the peripheral region thereof. The process in S250 will be described later in greater detail.

In S255 the object process unit 440 changes the color values of pixels in the scanned image 80 that are included in the object region represented by the partial binary image 80c (and specifically, the second object region 82c enclosed in the encircling line region 85c) to the background color value. The background color value is the value calculated in S235. This process converts the region in the scanned image 80 representing the second object 82 to background.

In S260 of FIG. 2, the region identification unit 420 determines whether the above process has been completed for all encircling line regions. If there remain any unprocessed encircling line regions (S260: NO), the region identification unit 420 returns to S225 and performs the above process on an unprocessed encircling line region.

Each of the processes in S250 and S255 is performed successively on scan data representing the scanned image 80. The processed image data obtained by completing the processes on all encircling line regions is used as the final processed data.

When the process has been completed for all encircling line regions (S260: YES), in S265 the processed data output unit 450 outputs the processed data to the multifunction peripheral 100 via the network 500. In S120 the processed data acquisition unit 230 of the multifunction peripheral 100 then acquires the processed data from the server 300. In S130 the print control unit 240 generates print data based on the processed data and supplies this print data to the printing unit 170. The printing unit 170 prints an image based on the print data received from the print control unit 240. In this example, the printing unit 170 prints the image shown in FIG. 3E.

Figure 4:
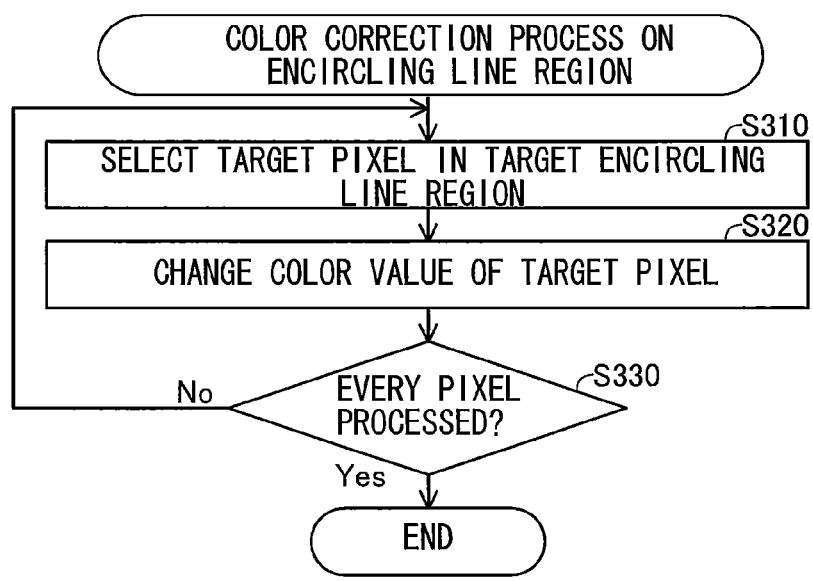
FIG. 4 is a flowchart illustrating steps in a color correction process performed on an encircling line region.

FIG. 4 is a flowchart illustrating steps in a color correction process performed on the encircling line regions. This process corresponds to step S250 in FIG. 2. In S310 at the beginning of the color correction process, the color value modification unit 430 selects one unprocessed pixel from among the plurality of pixels in the target encircling line region (such as the encircling line region 85c in FIG. 3D) as a target pixel.

Figures 5A, 5B:
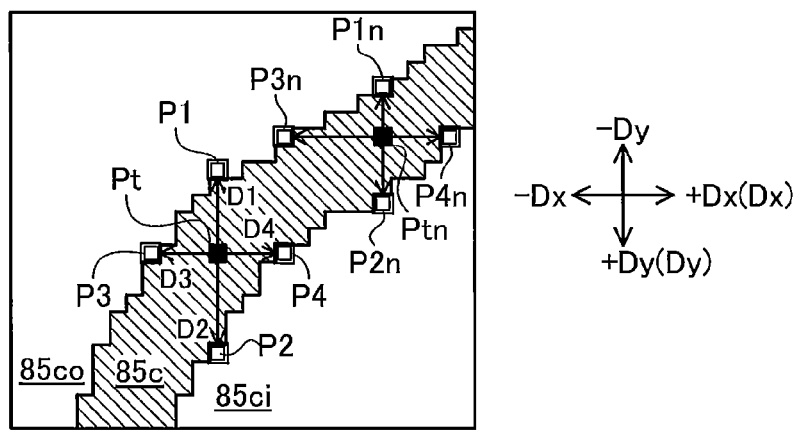
FIG. 5A is a schematic diagram illustrating the color correction process performed on the encircling line region according to the first embodiment.
FIG. 5B shows an equation for calculating a color value of a first target pixel according to the first embodiment.

FIG. 5A is an explanatory diagram illustrating the color correction process performed on the encircling line region. The drawing shows part of the encircling line region 85c and its peripheral region. The encircling line region 85c has been shaded. In FIG. 5A, Pt denotes the target pixel and is hereinafter called the "first target pixel Pt."

In S320 of FIG. 4, the color value modification unit 430 changes the color value of the target pixel in the scan data using color values of non-encircling-line pixels around the encircling line region 85c. In the first embodiment, the color value modification unit 430 sets a new color value for the target pixel using the color values of four non-encircling-line pixels determined based on the position of the target pixel. Hereinafter, pixels whose color values are used to calculate the color value of the target pixel will be called "color value pixels." FIG. 5A shows four color value pixels P1-P4 determined based on the first target pixel Pt. Specifically, these color value pixels are determined as follows.

The first color value pixel P1 is the closest non-encircling-line pixel to the first target pixel Pt among the plurality of non-encircling-line pixels on a line extending in the −Dy direction from the first target pixel Pt. The second color value pixel P2 is the closest non-encircling-line pixel to the first target pixel Pt among the plurality of non-encircling-line pixels on a line extending in the +Dy direction from the first target pixel Pt. The third color value pixel P3 is the closest non-encircling-line pixel to the first target pixel Pt among the plurality of non-encircling-line pixels on a line extending in the −Dx direction from the first target pixel Pt. The fourth color value pixel P4 is the closest non-encircling-line pixel to the first target pixel Pt among the plurality of non-encircling-line pixels on a line extending in the +Dx direction from the first target pixel Pt. All of the color value pixels P1-P4 selected in the above manner represent the background.

In this way, the color value modification unit 430 selects pixels to be used in calculating the new color value from lines extending from the first target pixel Pt in four orthogonal directions. Therefore, at least one pixel (the two pixels P2 and P4 in this case) is selected from the inside region 85ci, and at least one pixel (the two pixels P1 and P3 in this case) is selected from the outside region 85co. Hereinafter, a pixel selected from the inside region 85ci will be called an internal pixel, and a pixel selected from the outside region 85co will be called an external pixel.

FIG. 5B shows an equation for calculating a color value Pti of the first target pixel Pt from color values P1i-P4i of the color value pixels P1-P4, respectively. Here, the symbol "i" identifies one of the colors red, green, and blue, and distances D1-D4 denote the distances between the first target pixel Pt and the color value pixels P1-P4, respectively. The distance between two pixels may be set to the Euclidean distance between the centers of the pixels.

As shown in FIG. 5B, the color value Pti of the first target pixel Pt is a weighted average value of the color values P1i-P4i for the color value pixels P1-P4. The weights assigned color values P1i-P4i are larger for smaller distances D1-D4. Therefore, the color value modification unit 430 can change the color value of the first target pixel Pt to a value suited to positional relationships between the first target pixel Pt and the color value pixels P1-P4. Thus, the color value modification unit 430 can change the color value of the first target pixel Pt to a value suited to color changes in peripheral regions of the first target pixel Pt (the background region, for example).

In S330 of FIG. 4, the color value modification unit 430 determines whether all pixels in the target encircling line region have been processed. When there remain unprocessed pixels (S330: NO), the color value modification unit 430 returns to S310 and repeats the above process on an unprocessed pixel. The same process performed on the first target pixel Pt is performed on pixels other than the first target pixel Pt. FIG. 5A shows a second target pixel Ptn. In this case, the color value modification unit 430 selects four color value pixels P1n-P4n based on the second target pixel Ptn. Since the second target pixel Ptn is in a different position than the first target pixel Pt, the selected color value pixels P1n-P4n can be different from the color value pixels P1-P4 selected for the first target pixel Pt.

When all pixels in the target encircling line region have been processed (S330: YES), the color value modification unit 430 ends the process of FIG. 4.

As described above, the color value modification unit 430 changes the color value of the first target pixel Pt in the encircling line region 85c using color values of internal pixels P2 and P4 in the inside region 85ci, and color values of external pixels P1 and P3 in the outside region 85co. The color value modification unit 430 then changes the color value of the second target pixel Ptn in the encircling line region 85c using the internal pixels P2n and P4n in the inside region 85ci and the external pixels P1n and P3n in the outside region 85co. Since the color value modification unit 430 can change the color value of a target pixel in the encircling line region 85c constituting the encircling line object 85 to a color value suited to both the color values of internal pixels and the color values of external pixels, the color value modification unit 430 can reduce the likelihood of the color of the encircling line object 85 remaining in a color different from the peripheral color of the encircling line object 85 (the background color, for example) when the image is printed.

In particular, the equation in FIG. 5B can change the color value of the first target pixel Pt to a value between an internal pixel (one of the second color value pixel P2 and fourth color value pixel P4) and an external pixel (one of the first color value pixel P1 and third color value pixel P3). Similarly, the equation can change the color value of the second target pixel Ptn to a value between an internal pixel (one of the second color value pixel P2n and fourth color value pixel P4n) and an external pixel (one of the first color value pixel P1n and third color value pixel P3n). Thus, this method can suppress unnatural changes in color within the encircling line region 85c when the colors in the inside region 85ci and the outside region 85co differ.

As described with reference to FIG. 5B, the weights assigned to the color values P1i-P4i are larger when the distances D1-D4 are smaller. Therefore, the color value modification unit 430 can change the color value of the first target pixel Pt to a value that is suitable for the positional relationships between the first target pixel Pt and the color value pixels P1-P4. In the first embodiment, the pixels P1-P4 serving as positional references are the same pixels used for acquiring the color values P1i-P4i.

Further, as described with reference to FIG. 5A, the third color value pixel P3 and the fourth color value pixel P4 used for calculating the color value of the first target pixel Pt are disposed on opposing ends of a line segment that intersects the line segment connecting the first color value pixel P1 and second color value pixel P2. Therefore, the color value modification unit 430 can change the color value of the first target pixel Pt to a value suited to color changes in a plurality of directions. The same is true for all other target pixels and suppresses any noticeable traces of the encircling line object 85 in the processed image.

Note that the color values of pixels within the encircling line region 85c are carefully interpolated, as described in FIGS. 4 and 5, because the encircling line object 85 is an object that is not present in the image on the original. Consequently, the user observing the processed image would quickly sense something out of place if the processed image contained traces of an object not present in the original. Therefore, the color value modification unit 430 in the first embodiment carefully interpolates the color values of pixels in the encircling line region 85c to eliminate any noticeable traces of encircling lines in the processed image.

When generating or acquiring data such as scan data, processed data, and print data, the process units 210, 220, 230, and 240 of the multifunction peripheral 100 (and specifically the CPU 110) store this data in a storage device such as the volatile storage device 120. The process units 210, 220, 230, and 240 subsequently acquire data needed for processes by referencing the data stored in the storage device.

Similarly, when generating or acquiring data such as scan data, binary image data, label data, inclusion relation data, and processed data, the process units 410, 420, 430, 440, and 450 of the server 300 (and specifically the CPU 310) store this data in a storage device such as the volatile storage device 320. The process units 410, 420, 430, 440, and 450 subsequently acquire data needed for processes by referencing the data stored in the storage device.

B. Second Embodiment

Figures 6A, 6B:
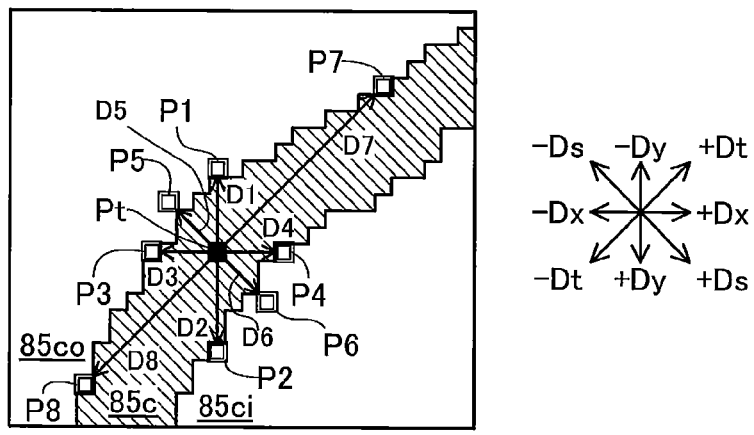
FIG. 6A is a schematic diagram illustrating a color correction process performed on the encircling line region according to a second embodiment.
FIG. 6B shows an equation for calculating the color value of the first target pixel according to the second embodiment.

A second embodiment of the present invention will be described with reference to FIGS. 6A and 6B. FIG. 6A is a schematic diagram illustrating a second embodiment for changing color values of target pixels in encircling line regions (S320 of FIG. 4). The second embodiment differs from the first embodiment shown in FIGS. 5A and 5B in that color value pixels are selected at points falling on lines extending in eight discrete directions from the target pixel. The hardware structure of the image-processing system used in the image process according to the second embodiment is identical to the image-processing system 900 shown in FIG. 1. Further, steps in the image process according to the second embodiment are identical to the steps shown in FIGS. 2 and 4.

The partial image shown in FIG. 6A is identical to the image in FIG. 5A. In addition to the four directions +Dx, −Dx, +Dy, and −Dy, FIG. 6A indicates four additional directions +Ds, −Ds, +Dt, and −Dt. The +Ds direction falls between the +Dx direction and +Dy direction and forms a 45-degree angle with each of these directions. The −Ds direction is the direction opposite the +Ds direction. The +Dt direction falls between the +Dx direction and −Dy direction and forms a 45-degree angle with each of these directions. The −Dt direction is the direction opposite the +Dt direction.

As shown in FIG. 6A, the color value modification unit 430 selects eight color value pixels P1-P8 determined based on the position of the first target pixel Pt. The four color value pixels P1-P4 are identical to the same pixels in FIG. 5A. The remaining four color value pixels P5-P8 are determined as follows.

The fifth color value pixel P5 is the closest non-encircling-line pixel to the first target pixel Pt among the plurality of non-encircling-line pixels on a line extending in the −Ds direction from the first target pixel Pt.

The sixth color value pixel P6 is the closest non-encircling-line pixel to the first target pixel Pt among the plurality of non-encircling-line pixels on a line extending in the +Ds direction from the first target pixel Pt.

The seventh color value pixel P7 is the closest non-encircling-line pixel to the first target pixel Pt among the plurality of non-encircling-line pixels on a line extending in the +Dt direction from the first target pixel Pt.

The eighth color value pixel P8 is the closest non-encircling-line pixel to the first target pixel Pt among the plurality of non-encircling-line pixels on a line extending in the −Dt direction from the first target pixel Pt.

Thus, the color value modification unit 430 selects pixels for calculating the color value of the first target pixel Pt from pixels on eight lines extending radially from the first target pixel Pt. Therefore, the color value modification unit 430 selects at least one pixel (the three pixels P2, P4, and P6 in this example) from the inside region 85ci, and at least one pixel (the five pixels P1, P3, P5, P7, and P8 in this example) from the outside region 85co.

FIG. 6B shows an equation for calculating the color value Pti of the first target pixel Pt based on color values P1i-P8i of the eight color value pixels P1-P8. Here, the symbol "i" identifies one of the colors red, green, and blue, and distances D1-D8 denote the distances from the first target pixel Pt to the color value pixels P1-P8, respectively. In the example of FIG. 6B, the color value modification unit 430 sets the color value Pti of the first target pixel Pt to the weighted average value of the color values P1i-P8i for the color value pixels P1-P8. Weights assigned to the color values P1i-P8i are larger for smaller distances D1-D8. Thus, the color value modification unit 430 changes the color value of the first target pixel Pt to a value suited to changes in color within the peripheral region of the first target pixel Pt.

Thus, as in the first embodiment described above, the color value of the first target pixel Pt in the second embodiment is set using color values of a plurality of non-encircling-line pixels surrounding the first target pixel Pt. Therefore, the second embodiment has the same advantages as the first embodiment. The second embodiment also uses more directions from the first target pixel Pt than the first embodiment for selecting color value pixels to be used in calculating the color value of the first target pixel Pt. Hence, the color value modification unit 430 in the second embodiment can change the color value of a pixel in an encircling line region to a color value suitable for color changes in the peripheral region surrounding the pixel in various directions.

C. Third Embodiment

A third embodiment of the present invention will be described with reference to FIGS. 7A, 7B and 7C. FIGS. 7A and 7B are schematic diagrams illustrating a third embodiment for changing color values of target pixels in encircling line regions (S320 of FIG. 4). The third embodiment differs from the first embodiment shown in FIGS. 5A and 5B in that the four color value pixels P1-P4 in FIGS. 5A and 5B are used as reference pixels P1s-P4s for referencing positions, while the color value pixels P1-P4 used for calculating the color value of the target pixel are selected based on the reference pixels P1s-P4s. Here, color value pixels separate from the reference pixels used as positional references are selected for calculating the color value of the target pixel in order to minimize the effects of noise that may be included in the color values of reference pixels adjacent to the encircling line region 85c. A scanned image represented by scan data generated with the reading unit 160 may contain noise in the color values of pixels neighboring edges of objects, such as encircling lines. Consequently, the color values of reference pixels may include such noise. In order to minimize the effects of this noise, the color value pixels used for calculating the color value of a target pixel in the third embodiment are selected from regions on the periphery of the reference pixels that have little change in color value. The hardware structure of the image-processing system used in the image process according to the third embodiment is identical to the image-processing system 900 shown in FIG. 1. Further, steps in the image process according to the third embodiment are identical to the steps shown in FIGS. 2 and 4.

The partial image shown in FIG. 7A is identical to the image in FIG. 5A. The method of selecting color value pixels based on reference pixels will be described below using a first reference pixel P1s as an example. The color value modification unit 430 selects the first reference pixel P1s according to the same procedure for selecting the first color value pixel P1 in FIG. 5A. Next, the color value modification unit 430 selects the first color value pixel P1 from the non-encircling-line pixels in a first searching range P1sa centered on the first reference pixel P1s. The first searching range P1sa is a prescribed rectangular region centered on the first reference pixel P1s that has two sides parallel to the first direction Dx and two sides parallel to the second direction Dy. The lengths of sides in the first searching range P1sa are set to "2*(5*resolution/300)+1", for example, where the symbol "*" is the multiplication operator and the resulting value is in units of pixels. "Resolution" in this equation is the resolution of the scan data and is in units of dpi. When the resolution is 300 dpi, the length of one side of the first searching range P1sa is 11 pixels. When the resolution is 600 dpi, the length of one side of the first searching range P1sa is 21 pixels. Thus, the size of the first searching range P1sa grows substantially in proportion to resolution. Therefore, when the first searching range P1sa is superimposed on the original image, the range of the image covered by the first searching range P1sa is approximately the same regardless the resolution of the scan data.

FIG. 7B is a schematic diagram showing the relationship between the first searching range P1sa and a width WL of the encircling line. As shown in the drawing, the size of the first searching range P1sa is preset such that a maximum distance Dsa from the first reference pixel P1s to the edge of the first searching range P1sa is smaller than the width WL of the encircling line. The width WL of the encircling line is the width of a line drawn by a prescribed pen and is preset based on the resolution. In this way, the first searching range P1sa is set to a region whose range from the first reference pixel P1s at its center is shorter than the width WL of the encircling line. This configuration reduces the likelihood of a color value pixel being selected from a region other than the inside region 85ci or outside region 85co that includes the reference pixel. For example, if the first reference pixel P1s is a pixel in the outside region 85co, the first searching range P1sa is configured to include pixels in the outside region 85co, but not pixels in the inside region 85ci. This prevents a color value pixel from being selected from the inside region 85ci when the first reference pixel P1s is a pixel in the outside region 85co.

Next, the color value modification unit 430 selects one non-encircling-line pixel from the first searching range P1 sa as a target pixel. The following description will assume that the first color value pixel P1 in FIG. 7A has been selected as the target pixel. The color value modification unit 430 calculates the distribution of color values using all non-encircling-line pixels in a first calculation range P1sr centered on the first color value pixel P1. In the third embodiment, the first calculation range P1sr is a prescribed rectangular region centered on the first color value pixel P1 that has two sides parallel to the first direction Dx and two sides parallel to the second direction Dy. Each side of the first calculation range P1sr is set to the length "2*(3*resolution/300)+1", for example, where the symbol "*" is the multiplication operator and the result has units in numbers of pixels. In this example, "resolution" indicates the resolution of the scan data and is given in units of dpi. When the resolution is 300 dpi, each side of the first calculation range P1sr is set to 7 pixels. When the resolution is 600 dpi, each side of the first calculation range P1sr is set to a length of 13 pixels.

In the third embodiment, the color value includes R, G, and B component values. Therefore, the color value modification unit 430 calculates the distribution of R component values, the distribution of G component values, and the distribution of B component values and uses the largest of these three distributions as the distribution of color values. As an alternative, the color value modification unit 430 may employ the distribution of a specific color component. For example, the color value modification unit 430 may calculate a brightness value from the R, G, and B component values and find the distribution of brightness values.

The color value modification unit 430 performs this type of distribution calculation using each of the non-encircling-line pixels in the first searching range P1sa as the target pixel. Next, the color value modification unit 430 selects the pixel based on which the smallest distribution was found as the color value pixel. In the example of FIG. 7A, the color value modification unit 430 has selected the first color value pixel P1 as the color value pixel. The color value modification unit 430 similarly selects color value pixels P2, P3, and P4 based on the other reference pixels P2s, P3s, and P4s. For example, the color value modification unit 430 selects the second color value pixel P2 in a second searching range P2sa using the second reference pixel P2s as reference. The second searching range P2sa is configured to include pixels in the inside region 85ci, which possesses the second reference pixel P2s, and to not include pixels in the outside region 85co.

FIG. 7C shows an equation for calculating the color value Pti of the first target pixel Pt based on color values P1ia-P4ia acquired from the four color value pixels P1-P4. The equation in FIG. 7C differs from that in FIG. 5B in two ways. The first difference is that distances D1s-D4s do not indicate the distances between the first target pixel Pt and the corresponding color value pixels P1-P4, but rather indicate the distances between the first target pixel Pt and the reference pixels P1s-P4s. For example, the first distance D1s indicates the distance between the first target pixel Pt and the first reference pixel P1s, and the second distance D2s indicates the distance between the first target pixel Pt and the second reference pixel P2s, for example.

The second difference is that the color values P1ia-P4ia are the average color values of non-encircling-line pixels within calculation ranges centered on the color value pixels P1-P4, respectively. For example, the first color value P1 is the average color value of non-encircling-line pixels in the first calculation range P1sr centered on the first color value pixel P1, and the second color value P2ia is the average color value of non-encircling-line pixels within a second calculation range P2sr centered on the second color value pixel P2.

In this way, the color values P1ia-P4ia calculated based on the color value pixels P1-P4, respectively, are average color values within regions with small color distributions. Hence, the average color values P1ia-P4ia are expected to represent values approaching the original color values in peripheral regions of the encircling line region (a background region, for example); that is, color values not influenced by noise. The equation in FIG. 7C is predicated on the assumption that the original color values of the reference pixels P1s-P4s are approximately the same as the color values P1ia-P4ia obtained based on the color value pixels P1-P4.

While the above description pertains to the first target pixel Pt, the color value modification unit 430 similarly changes the color values of the other pixels in the encircling line region 85c.

Thus, as in the first embodiment described above, the color value of the first target pixel Pt in the third embodiment is set using color values of a plurality of non-encircling-line pixels surrounding the first target pixel Pt. Therefore, the third embodiment has the same advantages as the first embodiment.

As shown in FIG. 7C, the weight applied to the second average color value P2ia for the plurality of pixels including the second color value pixel P2 (i.e. the color value associated with the second color value pixel P2) is larger for a smaller second distance D2s between the first target pixel Pt and the second reference pixel P2s, which is associated with the second color value pixel P2. The same is true for the fourth color value pixel P4. Further, the weight applied to the first average color value P1ia for the plurality of pixels including the first color value pixel P1 (i.e. the color value associated with the first color value pixel P1) is larger for a smaller first distance D1s between the first target pixel Pt and the first reference pixel P1s, which is associated with the first color value pixel P1. The same holds true for the third color value pixel P3. In this way, the color value modification unit 430 can change the color value of the first target pixel Pt to a value suited to the positional relationships among the first target pixel Pt, the internal reference pixels P2s and P4s, and the external reference pixels P1s and P3s, thereby suppressing any noticeable traces of the encircling line object 85 in the processed image.

As described with reference to FIG. 7A, the color value modification unit 430 selects the first color value pixel P1 from a prescribed range centered on the first reference pixel P1s (specifically, from the first searching range P1sa). In other words, the first reference pixel P1s is a pixel within a prescribed range centered on the first color value pixel P1 (a range having the same shape as the searching range). Similarly, the color value modification unit 430 selects the second color value pixel P2 from a prescribed range centered on the second reference pixel P2s (specifically, from the second searching range P2sa). In other words, the second reference pixel P2s is a pixel within a prescribed range centered on the second color value pixel P2. By modifying the color value of the first target pixel Pt according to the first reference pixel P1s near the first color value pixel P1 and the second reference pixel P2s near the second color value pixel P2, the color value modification unit 430 can minimize any noticeable traces of the encircling line object 85 in the processed image.

FIG. 7A also shows two line segments Sg1o and Sg2o passing through the first target pixel Pt. The first line segment Sg1o is orthogonal to a line segment Sg1 passing through the first target pixel Pt and first color value pixel P1, and the second line segment Sg2o is orthogonal to a line segment Sgt passing through the first target pixel Pt and second color value pixel P2.

The color value modification unit 430 selects the first reference pixel P1s from the region that includes the first color value pixel P1 obtained by dividing the scanned image by the first line segment Sg1o into two regions (specifically, the region on the −Dy side of the first line segment Sg1o). As described with reference to FIG. 7A, the first reference pixel P1s is positioned on the edge of the outside region 85co abutting the encircling line region 85c. In other words, the first reference pixel P1s is positioned so that its distance from the edge of the outside region 85co is no greater than the width WL of the encircling line region 85c as shown in FIG. 7B. Thus, a pixel near the first color value pixel P1 can be used as the first reference pixel P1s.

Similarly, the color value modification unit 430 selects the second reference pixel P2s from the region that includes the second color value pixel P2 obtained by dividing the scanned image by the second line segment Sg2o into two regions (specifically, the region on the +Dy side of the second line segment Sg2o). As described with reference to FIG. 7A, the second reference pixel P2s is positioned on the edge of the inside region 85ci abutting the encircling line region 85c. In other words, the second reference pixel P2s is positioned so that its distance from the edge of the inside region 85ci is no greater than the width WL of the encircling line region 85c as shown in FIG. 7B. Thus, a pixel near the second color value pixel P2 can be used as the second reference pixel P2s.

Through the above configuration, the color value modification unit 430 can minimize noticeable traces of the encircling line object 85 in the processed image.

As described with reference to FIG. 7A, the color value modification unit 430 sets each of the plurality of non-encircling-line pixels within the first searching range P1sa determined based on the first reference pixel P1s (that is, the first target pixel Pt) as a target pixel, determines the distribution of color values within a calculation range based on the position of this target pixel, and uses the pixel whose calculation range has the smallest distribution of color values as the first color value pixel P1. Similarly, the color value modification unit 430 sets each of the plurality of non-encircling-line pixels within the second searching range P2sa determined based on the second reference pixel P2s (that is, the first target pixel Pt) as a target pixel, determines the distribution of color values within a calculation range based on the position of this target pixel, and uses the pixel whose calculation range has the smallest distribution of color values as the second color value pixel P2. Therefore, the color value modification unit 430 can mitigate the effects of noise on the color value of the first target pixel Pt in order to minimize noticeable traces of the encircling line object 85 in the processed image.

As described with reference to FIG. 7A, the color value modification unit 430 also sets search ranges, such as the first searching ranges P1*sa* and P2*sa*, based on the resolution of the scanned image (that is, the pixel density). Therefore, the color value modification unit 430 can change the color value of the first target pixel Pt to a value suited to the pixel density in order to minimize noticeable traces of the encircling line object 85 in the processed image.

As shown in FIG. 7A, the third reference pixel P3*s* and fourth reference pixel P4*s* are disposed at opposite ends of a line segment intersecting the line segment connecting the first reference pixel P1*s* and second reference pixel P2*s*. As a result, the third color value pixel P3 and fourth color value pixel P4 used for calculating the color value of the first target pixel Pt are disposed on respective ends of a line segment (not shown) that intersects the line segment (not shown) connecting the first color value pixel P1 and second color value pixel P2. Accordingly, the color value modification unit 430 can change the color value of the first target pixel Pt to a value suited to color changes in a plurality of directions. The same effect can be obtained for the other target pixels. As a result, the color value modification unit 430 can minimize noticeable traces of the encircling line object 85 in the processed image.

D. Fourth Embodiment

A fourth embodiment of the present invention will be described with reference to FIGS. 8A, 8B and 8C. FIG. 8A is a schematic diagram illustrating a fourth embodiment for changing color values of target pixels in encircling line regions (S320 of FIG. 4). The fourth embodiment differs from the second embodiment shown in FIGS. 6A and 6B in the following ways. First, the color value modification unit 430 sorts eight color value pixels P1-P8 for calculating the color value of the first target pixel Pt into pixels pairs, each of which is composed of two pixels disposed along a line passing through the first target pixel Pt. As a result, the eight color value pixels P1-P8 are sorted into four pixel pairs. Next, the color value modification unit 430 calculates the color value of the first target pixel Pt using some of the four pixels pairs whose members have the largest difference in color value. The hardware structure of the image-processing system used in the image process according to the fourth embodiment is identical to the image-processing system 900 shown in FIG. 1. Further, steps in the image process according to the fourth embodiment are identical to the steps shown in FIGS. 2 and 4.

The partial image shown in FIG. 8A is identical to the image in FIG. 6A. FIG. 8A specifies eight color value pixels P1-P8. FIG. 8B is an explanatory diagram for describing four pixel pairs Pr1-Pr4, color value differences dC1-dC4, and selected pixel pairs. As shown, the four pixel pairs Pr1, Pr2, Pr3, and Pr4 are respectively configured of the pairs of pixels P1 and P2, P3 and P4, P5 and P6, and P7 and P8. The color value modification unit 430 calculates the color value differences dC1-dC4 between the members of each pixel pair Pr1-Pr4, respectively. Here, the color value modification unit 430 employs the difference in a specific color component. For example, the color value modification unit 430 may calculate a brightness value based on the R, G, and B component values and may employ the difference in brightness values between members of each pixel pair.

Next, the color value modification unit 430 selects pixel pairs having a relatively large difference in the color values of their members. Specifically, the color value modification unit 430 selects the pixel pair whose members have the largest difference in color value and the pixel pair whose members have the second largest difference in color value. In the following description, the pixels in the pixel pair whose color difference is the largest will be called pixels Pm1 and Pm2, and the pixels in the pixel pair having the second largest difference in color value will be called pixels Pn1 and Pn2.

FIG. 8C shows an equation for calculating the color value Pti of the first target pixel Pt from color values Pm1*i*, Pm2*i*, Pn1*i*, and Pn2*i* for the two selected pixel pairs (i.e., the four color value pixels Pm1, Pm2, Pn1, and Pn2). Here, the symbol "i" identifies one of the colors red, green, and blue, and distances Dm1, Dm2, Dn1, and Dn2 denote the distances from the first target pixel Pt to the color value pixels Pm1, Pm2, Pn1, and Pn2, respectively.

As shown in the equation, the color value Pti of the first target pixel Pt is the weighted average value of the color values Pm1*i*, Pm2*i*, Pn1*i*, and Pn2*i* for the four color value pixels P1-P4. Weights assigned to the color values Pm1*i*, Pm2*i*, Pn1*i*, and Pn2*i* are larger for smaller distances Dm1, Dm2, Dn1, and Dn2. Hence, the color value modification unit 430 can change the color value of the first target pixel Pt to a value suited to the positional relationships among the first target pixel Pt and the color values Pm1*i*, Pm2*i*, Pn1*i*, and Pn2*i*. Thus, the color value modification unit 430 can modify the color value of the first target pixel Pt to a value suited to color changes within the peripheral region of the first target pixel Pt (the background region, for example).

In the fourth embodiment, the color value modification unit 430 calculates a post-modification color value of the first target pixel Pt using the pixels in two of the four pixel pairs whose members have a relatively large difference in color value. Thus, the color value modification unit 430 can calculate the color value of the first target pixel Pt using pixel pairs whose members have a large difference in color value when this difference is due to gradation in the peripheral region of the encircling line region 85*c* (a background region, for example) and, hence, can minimize noticeable traces of the encircling line object 85 in the processed image.

In the example of FIG. 8A, three of the four pixel pairs Pr1-Pr4 (specifically, the pixel pairs Pr1, Pr2, and Pr3) include a pixel in the outside region 85*co* and a pixel in the inside region 85*ci*. Only some of these three pixel pairs Pr1, Pr2, and Pr3 having a relatively large difference in color value among its members are used for calculating the color value of the first target pixel Pt. Hence, if the color changes in a specific direction, the color value modification unit 430 can modify the color values of pixels in the encircling line region 85*c* to values suited to this change in color.

As shown in FIG. 8A, members in each of the four pixel pairs are positioned isotropically in relation to the first target pixel Pt. Hence, three or more pixel pairs may include both a pixel in the outside region 85*co* and a pixel in the inside region 85*ci* in areas of the curved encircling line region 85*c* where the curvature is small, as illustrated in FIG. 8A. In the fourth embodiment, the color value modification unit 430 uses some of the pixel pairs that include both a pixel in the outside region 85*co* and a pixel in the inside region 85*ci* that are associated with a relatively large difference in color value. Accordingly, when the color changes from the outside region 85*co* to the inside region 85*ci*, the color value modification unit 430 can modify the color values of pixels in the encircling line region 85*c* to values suitable for this change in color.

E. Fifth Embodiment

Figure 9:
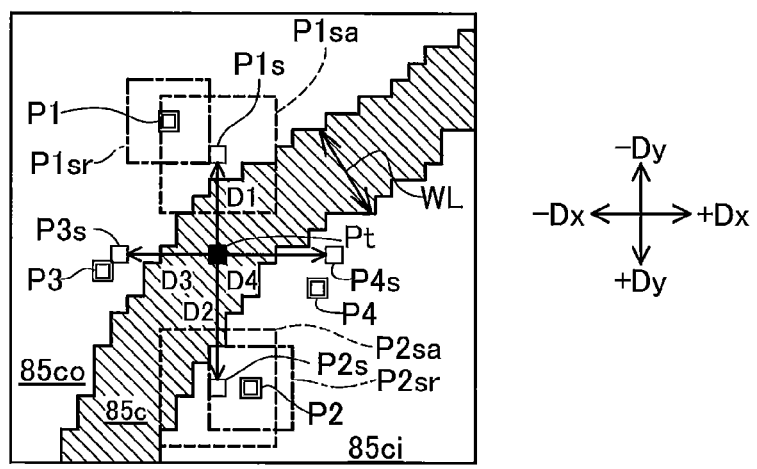
FIG. 9 is a schematic diagram illustrating a color correction process performed on the encircling line region according to a fifth embodiment.

A fifth embodiment of the present invention will be described with reference to FIG. 9. FIG. 9 is a schematic diagram showing a fifth embodiment for changing color values of target pixels in an encircling line region (S320 of FIG. 4). The fifth embodiment in FIG. 9 differs from the third embodiment shown in FIGS. 7A and 7B in that the pixels selected as the reference pixels P1s-P4s are separated from the encircling line region 85c. Specifically, the first reference pixel P1s is the closest pixel to the first target pixel Pt among the plurality of non-encircling-line pixels on a line extending in the −Dy direction from the first target pixel Pt that remain after excluding pixels abutting the encircling line region 85c. Pixels separated from the encircling line region 85c are similarly selected as the other reference pixels P2s-P4s. The steps for selecting the color value pixels P1-P4 and for calculating the color value of the first target pixel Pt are identical to those described with reference to FIG. 7.

In this way, pixels separated from the encircling line region 85c can be employed as the reference pixels P1s-P4s used for positional reference. Since pixels far from the encircling line region 85c are far from the edge of the encircling line object 85, these pixels have little effect from noise in color values (and specifically, noise produced near the edge). Hence, by selecting the color value pixels P1-P4 based on reference pixels P1s-P4s separated from the encircling line region 85c, the color value modification unit 430 can suppress the effects of noise on color values. However, if the distance between the reference pixels P1s-P4s and the encircling line region 85c is excessive, the encircling line region 85c may be corrected to a color that is different from the peripheral color of the encircling line region 85c. Therefore, the reference pixels P1s-P4s are preferably close to the encircling line region 85c in order to minimize noticeable traces of the encircling line object 85 in the processed image. For example, the second color value pixel P2 and fourth color value pixel P4 in the inside region 85ci are preferably set to pixels that are within a range no greater than the width WL of the encircling line region 85c from the edge of the inside region 85ci that abuts the encircling line region 85c. Similarly, the first color value pixel P1 and third color value pixel P3 in the outside region 85co are preferably set to pixels within a range no greater than the width WL of the encircling line of the encircling line region 85c from the edge of the outside region 85co that abuts the encircling line region 85c.

Sometimes blur is produced near the edge (contour, for example) of an object such as an encircling line in a scanned image generated by the reading unit 160. In the third embodiment shown in FIGS. 7A, 7B, and 7C and the fifth embodiment shown in FIG. 9, the color value modification unit 430 calculates the color values of pixels in an encircling line region using the color values of pixels separated from the encircling line region. Accordingly, the color value modification unit 430 can mitigate the effects of blurring on the calculated color values and can suitably minimize noticeable traces of the encircling line in the processed image.

F. Variations of the Embodiments (1) The color correction process performed by the color value modification unit 430 on encircling line regions is not limited to the processes described in the embodiments, but may be any of various processes that set the color of the encircling line region close to the color of the region around the encircling line region. For example, when calculating at least one of the (a) distribution of color values and (b) average color value in the third and fifth embodiments of FIGS. 7A-7C and 9, the color value modification unit 430 may skip some of the pixels in the calculation range, such as the pixels in even rows. Further, instead of using the average color value in the calculation region, the color value modification unit 430 may simply use the color value of the pixel whose calculation range was found to have the smallest distribution. For example, the color value modification unit 430 may use the color value of the first color value pixel P1, rather than an average value, as the first color value P1ia in FIG. 7C. In general, the color value modification unit 430 may use the color value of at least one pixel in the calculation range for calculating the color value of the first target pixel Pt. Further, the color value modification unit 430 is not limited to using pixels whose calculation ranges have the smallest distributions as the color value pixels P1-P4, but may use any of various pixels in the searching ranges excluding whose calculation ranges have the greatest distributions. Further, the searching ranges are not limited to rectangular regions, but may be regions having any of various shapes. For example, a circular region centered on the reference pixel may be used as the searching range. In any case, the searching range preferably is a region that includes the reference pixel. Similarly, the calculation range is not limited to a rectangular region, but may be a region of any shape, such as a circular region centered on the target pixel. In any case, the calculation region preferably includes the target pixel.

(2) The total number of color value pixels used for calculating the color value of one first target pixel Pt in the first to fifth embodiments shown in FIGS. 5A through 9 may be any number of 2 or greater. For example, the color value of the first target pixel Pt in the example of FIG. 5A may be calculated from the two color value pixels P1 and P2. Further, the method of selecting the color value pixels is not limited to the methods described with reference to FIGS. 5A through 9, but may be any of various methods such as a method that uses all non-encircling-line pixels within a prescribed region centered on the first target pixel Pt.

Further, the method of calculating the color value of the first target pixel Pt using color values of a plurality of color value pixels is not limited to the method described in the examples of FIG. 5A through 9, but may be any of various methods such as a method that simply employs averages without weighting.

(3) In the first, second, third, and fifth embodiments described with reference to FIGS. 5A through 7C and 9, the color value of the first target pixel Pt may be calculated as described in the embodiment with reference to FIGS. 8A-8C using some of the plurality of pixel pairs whose members have the greatest difference in color value. The total number of pixel pairs used for calculating the color value of the first target pixel Pt may be any number of 1 or greater. Alternatively, a preset number of pixel pairs may be used.

(4) Rather than using the encircling line region 85c identified in S240 as the encircling line region to be used by the color value modification unit 430, the region identification unit 420 may employ the third candidate region 85b identified in S220.

(5) The image process of the present invention may be modified in various ways and is not limited to the steps shown in FIG. 2. For example, any of various methods may be used to identify regions constituting encircling lines (i.e., encircling line regions) and regions not constituting encircling lines based on the target image, and are not limited to the method described in S205-S240 of FIG. 2. For example, step S210 may be omitted from the process. Further, pattern matching using prescribed patterns representing typical encircling line regions may be performed to identify encircling line regions in a target image. Further, the process in step S255 is not limited to a process for erasing objects enclosed in the encircling lines, but may be any process using objects enclosed in the encircling lines. For example, a process may be performed to erase all other objects in the image, while retaining the objects enclosed in the encircling lines. In any case, the color of pixels representing the objects may be interpolated when erasing the objects, as described in the process of step S250.

(6) The data processed according to the present invention may be employed in any application in addition to printing. For example, the processed data acquisition unit 230 of the multifunction peripheral 100 may store the processed data in the nonvolatile storage device 130 for future use. Further, the destination of the processed data outputted by the processed data output unit 450 may be any device in addition to the multifunction peripheral 100. For example, the processed data output unit 450 may output the processed data to another server (not shown) connected to the network 500.

(7) In addition to scan data produced by the reading unit 160, the target image data may be photographic image data captured by a device such as a digital camera, or image data generated using an application program for creating data such as text or illustrations, for example. Further, the encircling lines are not limited to those written with a pen, but may be encircling lines drawn over the image using the application program described above, for example.

(8) The functions in the embodiment of FIG. 1 for executing the image process (for example, the function of the image-processing unit 390, and specifically the functions of the process units 410, 420, 430, 440, and 450) may be implemented by various other devices than the server 300, such as a digital camera, a scanner, a personal computer, and a mobile telephone. Further, the functions of the image-processing unit 390 may be shared among a plurality of devices (computers, for example) capable of communicating over a network, so that the devices as a whole can provide the functions of the image-processing unit 390 (here, the system comprising the devices corresponds to the image processor).

Part of the configuration implemented in hardware in the embodiments described above may be replaced with software and, conversely, all or part of the configuration implemented in software in the embodiments may be replaced with hardware. For example, the functions of the region identification unit 420 in FIG. 1 may be implemented by dedicated hardware configured of logic circuits.

When all or part of the functions of the present invention are implemented with computer programs, the programs can be stored on a computer-readable storage medium (a non-temporary storage medium, for example). The programs may be used on the same storage medium on which they were supplied, or may be transferred to a different storage medium (computer-readable storage medium). The "computer-readable storage medium" may be a portable storage medium, such as a memory card or CD-ROM; an internal storage device built into the computer, such as any of various ROM; or an external storage device, such as a hard disk drive connected to the computer.

While the invention has been described in detail with reference to specific embodiments and variations thereof, it would be apparent to those skilled in the art that many modifications and variations may be made therein without departing from the spirit of the invention, the scope of which is defined by the attached claims.

What is claimed is:

1. An image-processing device comprising:
a processor; and
a memory storing computer-readable instructions therein, the computer-readable instructions, when executed by the processor, causing the image-processing device to perform:
identifying a first region and a second region in a target image represented by target image data, the first region representing an encircling line for identifying a specific sub-region in the target image, the first region including a plurality of pixels, the second region being different from the first region, the second region including: an inside region that is surrounded by the first region, and an outside region that is outside the first region, the inside region having a plurality of internal pixels, the outside region having a plurality of external pixels; and
changing a color value of each of the plurality of pixels using a color value of one of the plurality of internal pixels and a color value of one of the plurality of external pixels,
wherein the changing changes a color value of a first target pixel included in the plurality of pixels using a color value of a first internal pixel included in the plurality of internal pixels and a color value of a first external pixel included in the plurality of external pixels,
wherein the changing changes a color value of a second target pixel included in the plurality of pixels using a color value of a second internal pixel included in the plurality of internal pixels and a color value of a second external pixel included in the plurality of external pixels,
wherein the instructions further cause the image-processing device to perform:
selecting a first internal reference pixel corresponding to the first internal pixel and a first external reference pixel corresponding to the first external pixel;
assigning a first weight to the color value of the first internal pixel, the first weight being larger in a case that a first distance between the first target pixel and the first internal reference pixel is smaller; and
assigning a second weight to the color value of the first external pixel, the second weight being larger in a case that a second distance between the first target pixel and the first external reference pixel is smaller, and
wherein the color value of the first target pixel is changed using the first weight and the second weight.

2. The image-processing device according to claim 1, wherein the color value of the first target pixel is changed to a color value between the color value of the first internal pixel and the color value of the first external pixel; and
wherein the color value of the second target pixel is changed to a color value between the color value of the second internal pixel and the color value of the second external pixel.

3. The image-processing device according to claim 1, wherein the first internal reference pixel falls within a prescribed range centered on the first internal pixel; and
wherein the first external reference pixel falls within a prescribed range centered on the first external pixel.

4. The image-processing device according to claim 1, wherein the first external reference pixel has a third distance from an edge of the outside region that the first region contacts with, the third distance being no greater than a width of the encircling line represented by the first region, the first external reference pixel being positioned in one of two first divisional regions that includes the first external pixel, the two first divisional regions being obtained by dividing the target image by a first line, the first line passing through the first target pixel and being orthogonal to a line that connects the first target pixel and the first external pixel; and
wherein the first internal reference pixel has a fourth distance from an edge of the inside region that the first region contacts with, the fourth distance being no greater than the width of the first region, the first internal reference pixel being positioned in one of two second divisional regions that includes the first internal pixel, the two second divisional regions being obtained by dividing the target image by a second line, the second line passing through the first target pixel and being orthogonal to a line that connects the first target pixel and the first internal pixel.

5. The image-processing device according to claim 1, wherein the inside region has a third internal pixel and the outside region has a third external pixel;
wherein the color value of the first target pixel is changed using color values of the first internal pixel, the first external pixel, the third internal pixel, and the third external pixel; and
wherein one line segment connects the third internal pixel and the third external pixel, and another line segment connects the first internal pixel and the first external pixel, the one line segment intersecting the another line segment.

6. The image-processing device according to claim 1, wherein the inside region has a third internal pixel and the outside region has a third external pixel;
wherein the instructions further cause the image-processing device to perform
calculating a first difference and a second difference, the first difference being a difference between the color value of the first internal pixel and the color value of the first external pixel, the second difference being a difference between a color value of the third internal pixel and a color value of the third external pixel;
wherein the color value of the first target pixel is changed based on the color value of the first internal pixel and the color value of the first external pixel in a case that the first difference is larger than the second difference; and
wherein the color value of the first target pixel is changed based on the color value of the third internal pixel and the color value of the third external pixel in a case that the second difference is larger than the first difference.

7. The image-processing device according to claim 1, wherein the instructions further cause the image-processing device to perform:
specifying an internal searching range based on the first target pixel;
setting a first prescribed range for each of pixels that are within the internal searching range,
determining, as the first internal pixel, a specific internal pixel falling within the internal searching range and different from a pixel whose first prescribed range has a largest distribution of color values;
specifying an external searching range based on the first target pixel;
setting a second prescribed range for each of pixels that are within the external searching range; and
determining, as the first external pixel, a specific external pixel falling within the external searching range and different from a pixel whose second prescribed range has a largest distribution of color values.

8. The image-processing device according to claim 7, wherein the internal searching range and the external searching range are set based on a pixel density of the target image.

9. The image-processing device according to claim 1, wherein the instructions further cause the image-processing device to perform:
selecting the first target pixel and the second target pixel;
setting the first external pixel and the first internal pixel based on the first target pixel in a case that the first target pixel is selected; and
setting the second external pixel and the second internal pixel based on the second target pixel in a case that the second target pixel is selected.

10. A non-transitory computer readable storage medium storing a set of program instructions executed by a computer, the program instructions comprising:
identifying a first region and a second region in a target image represented by target image data, the first region representing an encircling line for identifying a specific sub-region in the target image, the first region including a plurality of pixels, the second region being different from the first region, the second region including: an inside region that is surrounded by the first region; and an outside region that is outside the first region, the inside region having a plurality of internal pixels, the outside region having a plurality of external pixels; and
changing a color value of each of the plurality of pixels using a color value of one of the plurality of internal pixels and a color value of one of the plurality of external pixels;
wherein the changing changes a color value of a first target pixel included in the plurality of pixels using a color value of a first internal pixel included in the plurality of internal pixels and a color value of a first external pixel included in the plurality of external pixels,
wherein the changing changes a color value of a second target pixel included in the plurality of the pixels using a color value of a second internal pixel included in the plurality of internal pixels and a color value of a second external pixel included in the plurality of external pixels,
wherein the program instructions further comprise:
selecting a first internal reference pixel corresponding to the first internal pixel and a first external reference pixel corresponding to the first external pixel;
assigning a first weight to the color value of the first internal pixel, the first weight being larger in a case that a first distance between the first target pixel and the first internal reference pixel is smaller; and
assigning a second weight to the color value of the first external pixel, the second weight being larger in a case that a second distance between the first target pixel and the first external reference pixel is smaller, and
wherein the color value of the first target pixel is changed using the first weight and the second weight.

11. An image-processing device comprising:
a processor; and
a memory storing computer-readable instructions therein, the computer-readable instructions, when executed by the processor, causing the image-processing device to perform:
identifying a first region and a second region in a target image represented by target image data, the first region representing an encircling line for identifying a specific sub-region in the target image, the first region including a plurality of pixels, the second region being different from the first region, the second region including: an inside region that is surrounded by the first region; and an outside region that is outside the first region, the inside region having a plurality of internal pixels, the outside region having a plurality of external pixels; and
changing a color value of each of the plurality of pixels using a color value of one of the plurality of internal pixels and a color value of one of the plurality of external pixels,
wherein the changing changes a color value of a first target pixel included in the plurality of pixels using a color value of a first internal pixel included in the plurality of internal pixels and a color value of a first external pixel included in the plurality of external pixels, wherein the changing changes a color value of a second target pixel included in the plurality of pixels using a color value of a second internal pixel included in the plurality of internal pixels and a color value of a second external pixel included in the plurality of external pixels, wherein the inside region has a third internal pixel and the outside region has a third external pixel, wherein the instructions further cause the image-processing device to perform calculating a first difference and a second difference, the first difference being a difference between the color value of the first internal pixel and the color value of the first external pixel, the second difference being a difference between a color value of the third internal pixel and a color value of the third external pixel, wherein the color value of the first target pixel is changed based on the color value of the first internal pixel and the color value of the first external pixel in a case that the first difference is larger than the second difference, and wherein the color value of the first target pixel is changed based on the color value of the third internal pixel and the color value of the third external pixel in a case that the second difference is larger than the first difference.

12. The image-processing device according to claim 11,
wherein the color value of the first target pixel is changed to a color value between the color value of the first internal pixel and the color value of the first external pixel, and
wherein the color value of the second target pixel is changed to a color value between the color value of the second internal pixel and the color value of the second external pixel.

13. The image-processing device according to claim 11,
wherein the inside region has a third internal pixel and the outside region has a third external pixel,
wherein the color value of the first target pixel is changed using color values of the first internal pixel, the first external pixel, the third internal pixel, and the third external pixel, and wherein one line segment connects the third internal pixel and the third external pixel, and another line segment connects the first internal pixel and the first external pixel, the one line segment intersecting the another line segment.

14. The image-processing device according to claim 11,
wherein the instructions further cause the image-processing device to perform:
specifying an internal searching range based on the first target pixel;
setting a first prescribed range for each of pixels that are within the internal searching range;
determining, as the first internal pixel, a specific internal pixel falling within the internal searching range and different from a pixel whose first prescribed range has a largest distribution of color values;
specifying an external searching range based on the first target pixel;
setting a second prescribed range for each of pixels that are within the external searching range; and
determining, as the first external pixel, a specific external pixel falling within the external searching range and different from a pixel whose second prescribed range has a largest distribution of color values.

15. The image-processing device according to claim 14,
wherein the internal searching range and the external searching range are set based on a pixel density of the target image.

16. The image-processing device according to claim 11,
wherein the instructions further cause the image-processing device to perform:
selecting the first target pixel and the second target pixel;
setting the first external pixel and the first internal pixel based on the first target pixel in a case that the first target pixel is selected; and
setting the second external pixel and the second internal pixel based on the second target pixel in a case that the second target pixel is selected.

\* \* \* \* \*